US007893662B2

(12) United States Patent
Ribellino et al.

(10) Patent No.: US 7,893,662 B2
(45) Date of Patent: Feb. 22, 2011

(54) METHOD AND RELATED DEVICE FOR CHARGING AT THE SAME VOLTAGE TWO OR MORE CAPACITORS CONNECTED IN SERIES

(75) Inventors: Calogero Ribellino, Mascalucia (IT); Giovanni Benenati, S. Giovanni la Punta (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 434 days.

(21) Appl. No.: 12/168,302

(22) Filed: Jul. 7, 2008

(65) Prior Publication Data

US 2009/0015211 A1    Jan. 15, 2009

(30) Foreign Application Priority Data

Jul. 9, 2007    (IT)    .......................... VA2007A0061

(51) Int. Cl.
*H02J 7/00*    (2006.01)
*H02M 3/18*    (2006.01)
*G05F 1/00*    (2006.01)

(52) U.S. Cl. ....................... 320/167; 320/166; 320/128; 307/109; 323/242; 323/288; 323/326

(58) Field of Classification Search ................... 320/167
See application file for complete search history.

(56) References Cited

U.S. PATENT DOCUMENTS

| 5,198,743 | A  | * | 3/1993  | McClure et al. | ............. | 320/145 |
| 6,384,579 | B2 | * | 5/2002  | Watanabe       | ................... | 320/166 |
| 6,411,064 | B1 | * | 6/2002  | Brink          | ......................... | 320/166 |
| 6,417,649 | B1 | * | 7/2002  | Brink          | ......................... | 320/166 |
| 2001/0054881 | A1 | * | 12/2001 | Watanabe   | .................. | 320/166 |
| 2002/0101742 | A1 | * | 8/2002  | Hosotani et al. | ............. | 363/17 |
| 2004/0113589 | A1 | * | 6/2004  | Crisp et al.    | ................. | 320/128 |

FOREIGN PATENT DOCUMENTS

FR    2838572    10/2003

* cited by examiner

*Primary Examiner*—Edward Tso
*Assistant Examiner*—Yalkew Fantu
(74) *Attorney, Agent, or Firm*—Lisa K. Jorgenson; Allen, Dyer, Doppelt, Milbrath & Gilchrist, P.A.

(57) ABSTRACT

A device, such as a pump capacitor or an energy storing inductor, is charged by coupling it to a voltage source. Thereafter, the device is connected in parallel to one of the capacitors or capacitance cells to be charged, and the charging of the device and successive connections of it in parallel to a selected capacitor of the series of capacitors for charging it are replicated for all the capacitors of the series. The sequence of different connections of the device to the charge voltage source and to the selected one of the capacitors of the series is actuated through a plurality of coordinately controlled switches that establish distinct current circulation paths, according to a switched-capacitor or switched inductor techniques driven by respective periodic control signals that may be generated from a master clock signal.

20 Claims, 3 Drawing Sheets

METHOD AND RELATED DEVICE FOR CHARGING AT THE SAME VOLTAGE TWO OR MORE CAPACITORS CONNECTED IN SERIES

FIELD OF THE INVENTION

This invention relates in general to charging circuits, and, more particularly, to a method and related circuit for charging two capacitors connected in series and reducing the generation of excessively large inrush charge currents.

BACKGROUND OF THE INVENTION

Use of cellular phones as photo-cameras requires increased current use. Enhancement of image quality in scarcely illuminated scenes also requires a powerful LED. Batteries are useful to deliver peak current beyond a certain limit and this leads to the development and use of so-called "super-capacitors". The capacitance of these components may be on the order of one Farad, and thus are able to accumulate a large amount of energy and to deliver it in a very short time (as required by a photo-camera flash).

A super-capacitor (SC) typically includes two or more capacitors, also called capacitance cells, in series for supplying a voltage larger than that of an available voltage source, for example, a battery. For example, for common FLASH applications that use white-light power LEDs with a threshold voltage higher than 4V, present fabrication technology of silicon integrated circuits may ensure that a single integrated capacitance cell will withstand a voltage of about 2.5V at most without degrading. This may be insufficient.

To address the problem, at least two capacitance cells are connected in series as shown in FIG. 1, obtaining a three-terminal integrated component in case of only two cells capable of withstanding up to 5V on its opposite end nodes, or generally a multi-terminal integrated component when more than two cells are connected in series. The central or any of the intermediate nodes of the series is accessible from outside the integrated circuit device because, when charging the multi-cell integrated capacitor each of the single capacitance cells or capacitor of the series should be charged at the same voltage.

In practice, it may be important that, while charging them, none of the capacitance cells be subjected to a voltage in excess of the maximum threshold of the fabrication technology (e.g. 2.5V in the considered case) and that, at the same time, in each cell be stored the maximum possible energy. However, every integrated capacitance cell generally has a small but non-null leakage current. Therefore, considering the exemplary case of only two cells in series, if they have different leakage currents, the voltage on the central node of the three terminal component shifts higher or lower than the mid-value of the applied charge voltage, with the risk of exceeding the breakdown voltage of the cell with the smallest leakage.

A simple way of controlling the voltage on the central node as shown in FIG. 2 includes using a unity gain operational amplifier suitably connected for regulating its output node to remain always at the half value of the applied charge voltage. The drawbacks of this simple approach are the relatively large consumption and the need for an applied charge voltage source that should desirably not become smaller than the voltage at which the multicell integrated super-capacitor is charged. Moreover, it may be desirable to ensure control so that no excessive inrush currents are produced because of the very low equivalent resistance of the super-capacitor.

A simple and immediate way of charging a super-capacitor and addressing the problem of excessively large inrush currents includes using a voltage regulator connected in series with an output current limiter, as disclosed in the published patent application FR 2,838,572. With this approach, the current supplied by the voltage source (for example a battery) is limited and in addition the charge voltage of the super-capacitor is controlled.

Unfortunately, this approach, for a super-capacitor including two or more capacitors in series, may require a control circuit for the voltage on the central node of the series connected capacitors.

SUMMARY OF THE INVENTION

An object of the invention is to provide a simple and efficient method and a related device for simultaneously charging at a same charge voltage each one of a plurality of capacitors (capacitance cells) connected in series while reducing or preventing excessively large inrush currents.

According to the method, a pump capacitor or alternatively an energy storing inductor is charged by coupling it to a voltage source, thereafter the charged pump capacitor or energy storing inductor is connected in parallel to one of the capacitors or capacitance cell to be charged and the charging of the pump capacitor or energy storing inductor and successive connecting it in parallel to a selected capacitor of the series of capacitors for charging it are replicated for all the capacitors of the series. The charging process may contemplate the performance of numerous charging cycles on the same capacitor of the series or numerous sequences of charging steps replicated for all or some of the capacitors of the series. The sequence of different connections of the pump capacitor or inductor to the charge voltage source and to the selected one of the capacitors of the series is actuated through a plurality of coordinately controlled switches that establish distinct current circulation paths, according to a switched-capacitor or switched inductor technique, all driven by respective periodic control signals, generated from a master clock signal.

In charging all the capacitance cells substantially at the same time, at every charge/discharge cycle it may be decided which capacitance (cell) is going to be charged by connecting in parallel thereto the charged pump capacitor or charged inductor, depending on the voltages detected on each capacitance cell of a so-called super-capacitor. A periodic check of the voltages will reveal if any of the cells in series has lost charge assuming a lower voltage, in which case the system may carry out a series of charge/discharge operations for recharging to full voltage any capacitance cell found undercharged.

Moreover, as in any switching mode energy transfer mechanism and also in the method of this invention, the switching frequency and the duty-cycle of charge/discharge phases may be adjusted as a function of the voltages sensed on the capacitance cells.

DETAILED DESCRIPTION OF THE PREFERRED EMBODIMENTS

Figure 1:
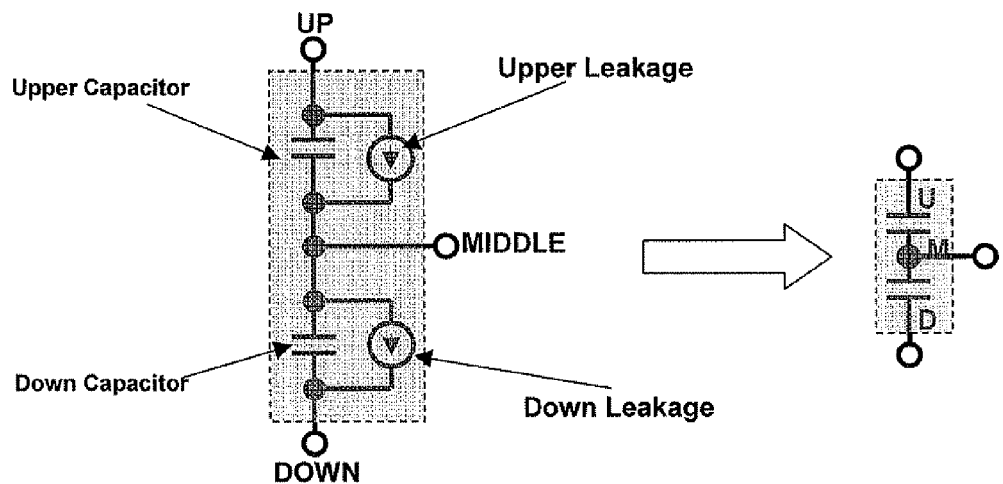
FIG. 1 is a schematic diagram illustrating electrical schemes of two super-capacitors in series as in the prior art.
Figure 2:
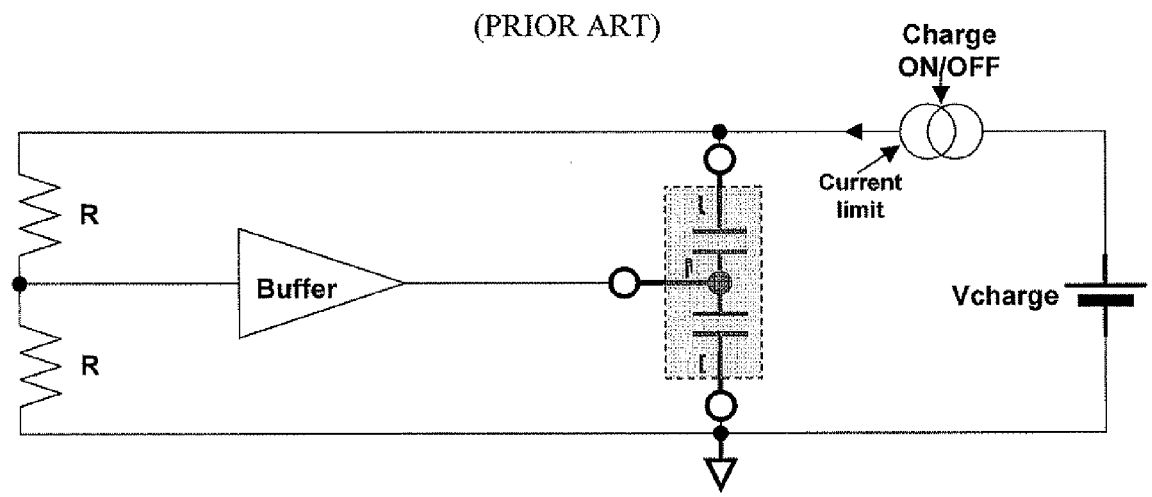
FIG. 2 is a schematic diagram illustrating a circuit for charging two capacitors in series while keeping the voltage of the intermediate node equal to half the voltage between the two end nodes of the series as in the prior art.
Figure 3A:
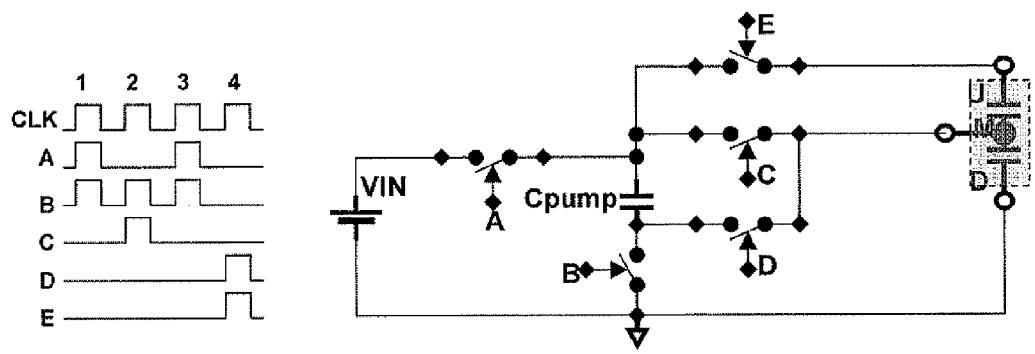
FIGS. 3*a* and 3*b* are schematic diagrams illustrating switched capacitor or switched inductor circuits, respectively, and of the graphs of the respective control phases for charging two capacitors in series from a battery in accordance with the present invention.
Figure 3B:
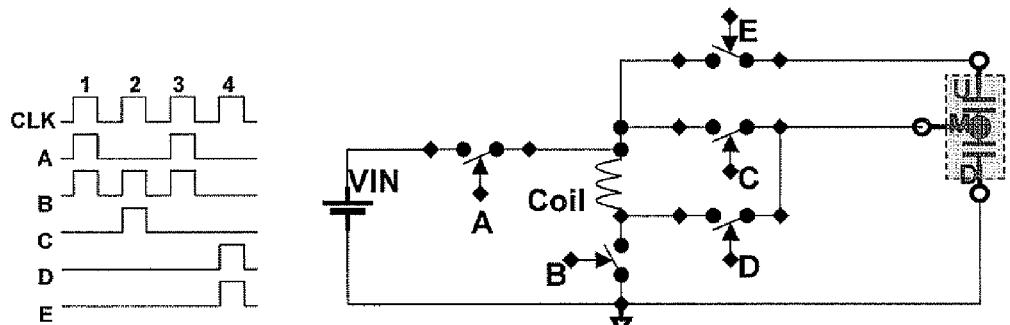

According to a method of this invention, to charge at a same voltage each one of two or more capacitors connected in series while preventing the generation of excessively large inrush currents, the capacitors connected in series are charged with a switched capacitor technique exemplarily implemented for the case of only two capacitors in series, with the circuits illustrated schematically in FIGS. 3a and 3b, using either a pump capacitor or an inductor, alternately connected to the battery and in parallel to one capacitor of the series to be charged.

Referring to the exemplary case of a super capacitor comprising two capacitors connected in series, they are charged by cyclically performing the following four charge/discharge phases:

1) a pump capacitor (or inductor) Cpump (Coil) is charged at a certain voltage VIN, by enabling the switches A and B;

2) the pump capacitor (or inductor) Cpump (Coil) is connected in parallel to a capacitor of the super-capacitor, by enabling the switches B and C;

3) the pump capacitor (or inductor) Cpump (Coil) is charged again at the voltage VIN by enabling again the switches A and B; and 4) the pump capacitor (or inductor) Cpump (Coil) is connected in parallel to the other capacitor of the super-capacitor, by enabling the switches D and E.

Repetition of the above charge/discharge sequence is stopped (or suspended) when a certain desired voltage on the end terminals U and D of the super-capacitor is attained. With this technique, it may be ensured that the voltages, at which each of the capacitance cells connected in series to form the super-capacitor is charged, are the same and substantially equal to the voltage VIN of the source even in presence of mismatches between the two cells.

The full charge and/or uniformity of the state of charge of the two capacitance cells that compose the super-capacitor can be further enhanced by monitoring the voltage of the central point and deciding for each charge/discharge cycle which cell of the super-capacitor is to be charged, such to keep the cells at substantially the same charge level during the charging process of the super-capacitor. This may be done, for example, by adjusting the frequency and/or the duration of the control phases of the switches.

Of course, the method may be used for charging super-capacitors comprising more than two cells in series using the same voltage source VIN and a single pump capacitor or inductor Cpump (Coil), by expanding the number of charge/discharge steps of the above described sequence to include any number of additional cells to the two considered above.

The voltage on the end terminals of the super-capacitor will be equal to the charge source voltage VIN multiplied by the number of capacitors (cells) connected in series. With this technique, relatively large DC voltages may be produced even in portable systems supplied by a battery. The activation sequence of the switches may be enhanced or optimized by contemplating a start-up phase for reducing dissipation effects, using only the switches A, B, E at start up when the super capacitor is almost completely discharged.

Figure 4:
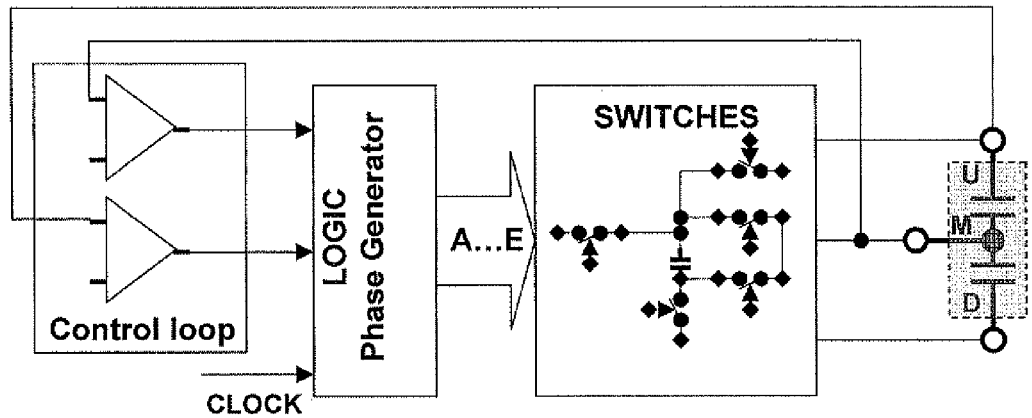
FIG. 4 is a schematic diagram illustrating a switched capacitor circuit embodiment of this invention for charging two capacitors in series from a battery.
Figure 5A:
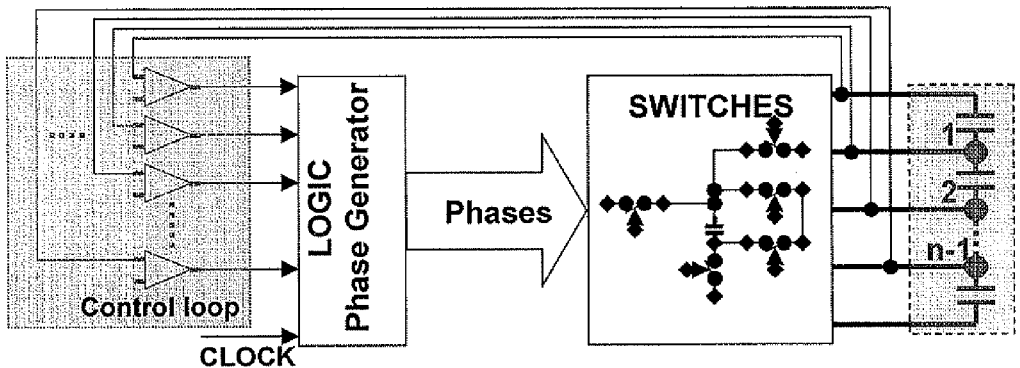
FIGS. 5a and 5b are schematic diagrams illustrating switched capacitor and switched inductor circuit embodiments of the invention, respectively, for charging a number N of capacitors in series, each at the voltage of a charge battery.
Figure 5B:
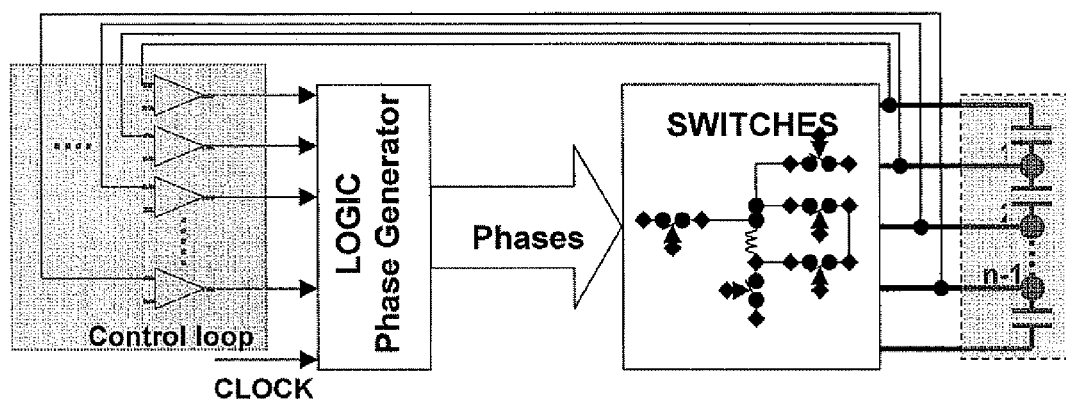
Figure 6:
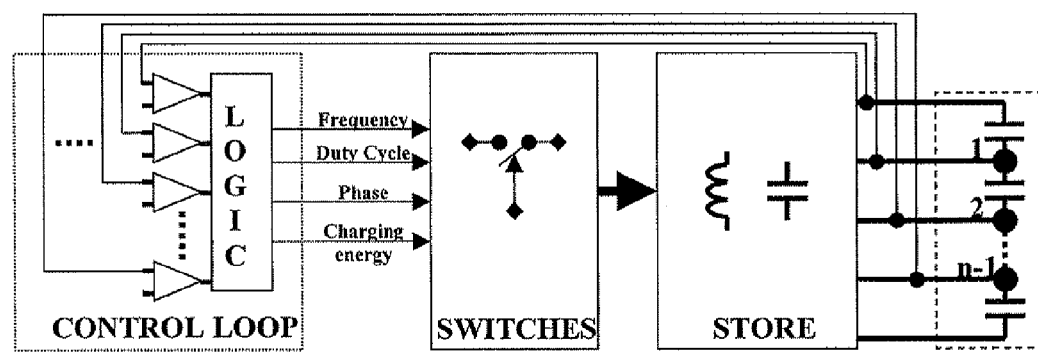
FIG. 6 is a schematic diagram illustrating a circuit of the present invention for charging a number N of capacitors connected in series, each at the voltage of a charge battery by adjusting at least one parameter among frequency, duty-cycle, phase and charge voltage or current.

The proposed approach may be implemented almost wholly in integrated form, except for the pump capacitor or inductor Cpump (Coil). Substantially, the device comprises the following parts, depicted in FIG. 4:

1) a circuitry block SWITCHES, with the function of connecting the pump capacitor (inductance) to the various terminals (VIN, U, M, D);

2) a circuitry block LOGIC PHASE GENERATOR, with the function of generating the logic signals used for driving the SWITCHES; and 3) a circuitry block CONTROL LOOP, with the function of monitoring the charge voltage of the super-capacitor and, in the example shown, of the central point, having supposed that the cell capacitors may not be identical. This block distributes the charge of the pump capacitor or inductor Cpump (Coil) by monitoring the maximum charge voltage (U) as well as the voltage of the central point (M) and intervenes by varying at least one parameter among frequency, duty-cycle, charge/discharge sequence, charge voltage or current of the capacitor or inductor Cpump (Coil).

Of course, the illustrated method and the related device can be easily generalized to the case in which more than two component capacitors in series of a super-capacitor of more than three terminals are to be charged. In this case, the voltage on each capacitor or cell of the series may be monitored and periodic control signals or phases, besides those already described for connecting the charge pump capacitor (or inductor) to the battery, to connect the charged pump capacitor (or inductor) in parallel to a currently selected cell to be charged, or even in parallel to a series of two or more cells of a longer string of cells connected in series to be charged are generated.

The switching frequency of the plurality of periodic control signals necessary to control the sequential switches as needed, the duty-cycle of ON-OFF phases of the switches, and the charge/discharge sequence of the pump capacitor (or inductor) can be adjusted as a function of the maximum sensed voltages, for controlling the energy stored in the super-capacitor and the charge currents. How the maximum current absorbed from the battery may be fixed for preventing the circulation of excessively large inrush currents (or input surge currents) by properly dimensioning the pump capacitor (or inductor), and how the clock frequency and the duty-cycle are regulated will now be described.

For example, Cs being the capacitance of a single component capacitor (cell) of the super capacitor, the charge at each cycle on Cpump is:

$$Q = C\text{pump} * V\text{in}$$

When Cpump is connected in parallel to the cell of the super-capacitor, the capacitor Cs will be charged at the voltage:

$$V = C\text{pump} * V\text{in} / Cs$$

The time constant of the circuit is:

$$t = C\text{pump} * 2 * Rs$$

wherein Rs is the resistance of the switches used for connecting the pump capacitor Cpump with the capacitor Cs.

If the clock has a frequency f with duty cycle equal to 50%, the current I supplied by the battery Vin for charging each capacitor Cs is:

$$I = C_{pump} * V_{in} * f$$

A similar result is obtained using a switched inductor.

Vcs being the maximum voltage on the nodes of each module (generally Vcs=2V), f the clock frequency, and Ip the peak current through the energy storing inductor Coil, if the duty-cycle is 50%, when a capacitor Cs is connected in parallel to the pump inductance Coil the current therethrough decreases less than 10%.

Choosing the inductance L of the pump inductor Coil according to the following empirical formula:

$$L > V_{cs}/(0.2 * I_p * f)$$

the current supplied by the battery will be about Ip/2 and, at each cycle, Cs it will charge to the voltage V=Ip/(2*f*Cs).

The advantages of the proposed system are: 1) it offers an efficient way of charging super-capacitors using a single external component (Cpump or Coil); 2) it does not require any voltage regulator; 3) it does not require any current limiter, because it is limited by the design size of the switches, the frequency and the design capacitance value of the pump capacitor (or inductor) Cpump (Coil); 4) all "N" capacitors (cells) in series that constitute the super-capacitor are similarly charged in parallel and all at the same voltage (this condition is of course automatically verified should all capacitors be identical, however, in the system of this invention it is forced by the system through the block CONTROL LOOP, compensating for any significant differences among the component capacitors 0; and 5) intrinsically it offers a voltage multiplication of the available voltage source, thus allowing to store a significantly increased amount of energy even starting from a relatively low voltage such as a battery voltage.

That which is claimed is:

1. A method of charging, at a same voltage of a charge voltage source, at least two capacitors coupled in series, the method comprising:
    charging a charge circuit device comprising at least one of a pump capacitor and an inductor, by coupling the charge circuit device to the charge voltage source during first synchronized ON phases of a first and of a second periodic control signal;
    coupling the charge circuit device in parallel to one of the capacitors during synchronized ON phases of the second and of a third periodic control signal;
    charging again the charge circuit device during second synchronized ON phases of the first and second periodic control signals;
    coupling the charge circuit device in parallel to another of the capacitors during synchronized ON phases of a fourth and a fifth periodic control signal; and
    generating the periodic control signals from a master clock signal, the periodic control signals having periods that are multiples of a period of the master clock signal.

2. The method of claim 1 wherein the at least two capacitors comprises a number N of capacitors coupled in series; and further comprising:
    providing N−1 pairs of periodic control signals for selecting any one of the number N of capacitors to be coupled in parallel to the charge circuit device; and
    charging again the charge circuit device during second simultaneous ON phases of the first and second periodic control signals followed by a coupling of the charge circuit device in parallel to an additional capacitor of the number N of capacitors in response to an additional pair of the N−1 pairs of periodic control signals.

3. The method of claim 1, further comprising comparing a voltage on the capacitors with a threshold value for carrying out charge cycles on the capacitors to be charged at the voltage of the charge voltage source, until reaching the threshold value.

4. The method of claim 1, further comprising sensing a voltage on each of the capacitors and charging any of the capacitors undercharged to the same voltage.

5. The method of claim 1, further comprising adjusting frequency and duty cycle between phases of the periodic control signals.

6. A method of charging, at a same voltage of a charge voltage source, at least two capacitors coupled in series, the method comprising:
    charging a charge circuit device by coupling the charge circuit device to the charge voltage source during a first phase;
    coupling the charge circuit device in parallel to one of the capacitors during a second phase;
    charging again the charge circuit device during a third phase;
    coupling the charge circuit device in parallel to another of the capacitors during a fourth phase; and
    generating periodic control signals, to define the phases, based upon a clock signal.

7. The method of claim 6, wherein the charge circuit device comprises at least one of a pump capacitor and an inductor.

8. The method of claim 6, further comprising comparing a voltage on the capacitors with a threshold value for carrying out charge cycles on the capacitors to be charged at the voltage of the charge voltage source, until reaching the threshold value.

9. The method of claim 6, further comprising sensing a voltage on each of the capacitors and charging any of the capacitors undercharged to the same voltage.

10. The method of claim 6, further comprising adjusting frequency and duty cycle of the periodic control signals.

11. A device for charging, with a charge voltage source, at least two capacitors coupled in series, the device comprising:
    a charge circuit device comprising at least one of a pump capacitor and an inductor for transferring electrical energy from the charge voltage source to a selected one of the capacitors coupled in series;
    an array of circuit configuration switches, each controlled by a respective periodic control signal for coupling the charge circuit device to the charge voltage source and successively, in parallel, to the selected one of the capacitors;
    a control signal circuit for generating the periodic control signals from a clock signal to operate the array of circuit configuration switches; and
    a control block for monitoring a voltage on each of the capacitors, and to manage the control signal circuit to generate respective periodic control signals for coupling the charge circuit device to the selected capacitor.

12. The device of claim 11, wherein the control block compares a voltage on the capacitors with a threshold value for carrying out charge cycles on the capacitors to be charged at the voltage of the charge voltage source, until reaching the threshold value.

13. The device of claim 11, wherein the control block senses a voltage on each of the capacitors and controls charging of the capacitors to a same voltage.

14. The device of claim 11, wherein the control loop adjusts frequency and duty cycle of the periodic control signals.

15. A device for charging, with a charge voltage source, at least two capacitors coupled in series, the device comprising:
 a charge circuit device for charging a selected one of the capacitors connected in series via the charge voltage source;
 an array of circuit configuration switches, each controlled by a respective periodic control signal for selectively connecting the charge circuit device to the charge voltage source and the selected one of the capacitors;
 a control signal circuit for generating the periodic control signals to operate the array of circuit configuration switches so that
  the charge circuit device is connected to the charge voltage source during first synchronized ON phases of a first and of a second periodic control signal,
  the charge circuit device is connected in parallel to one of the capacitors during synchronized ON phases of the second and of a third periodic control signal,
  the charge circuit device is charged again during second synchronized ON phases of the first and second periodic control signals, and
  the charge circuit device is connected in parallel to another of the capacitors during synchronized ON phases of a fourth and a fifth periodic control signal.

16. The device of claim 15, further comprising a control block for monitoring a voltage on each of the capacitors, and to manage the control signal circuit to generate respective periodic control signals for coupling the charge circuit device to the selected capacitor.

17. The device of claim 15, wherein the charge circuit device comprises at least one of a pump capacitor and an inductor.

18. The device of claim 15, wherein the control block compares a voltage on the capacitors with a threshold value for carrying out charge cycles on the capacitors to be charged at the voltage of the charge voltage source, until reaching the threshold value.

19. The device of claim 15, wherein the control block senses a voltage on each of the capacitors and controls charging of the capacitors to a same voltage.

20. The device of claim 15, wherein the control loop adjusts frequency and duty cycle of the periodic control signals.

\* \* \* \* \*

UNITED STATES PATENT AND TRADEMARK OFFICE
CERTIFICATE OF CORRECTION

| | | |
|---|---|---|
| PATENT NO. | : 7,893,662 B2 | Page 1 of 1 |
| APPLICATION NO. | : 12/168302 | |
| DATED | : February 22, 2011 | |
| INVENTOR(S) | : Ribellino et al. | |

It is certified that error appears in the above-identified patent and that said Letters Patent is hereby corrected as shown below:

Title Page, Item (75) Inventors, should read

--(75) Inventors: Calogero Ribellino, Mascalucia (IT); Giovanni Benenati, S. Giovanni la Punta (IT); Karel Blaha, Pilser (CZ); Marek Stepan, Praha (CZ); Jindrich Duda, Prague (CZ)--.

Signed and Sealed this
Twenty-fourth Day of November, 2015

Michelle K. Lee
*Director of the United States Patent and Trademark Office*

UNITED STATES PATENT AND TRADEMARK OFFICE
CERTIFICATE OF CORRECTION

PATENT NO. : 7,893,662 B2  
APPLICATION NO. : 12/168302  
DATED : February 22, 2011  
INVENTOR(S) : Ribellino et al.

Page 1 of 1

It is certified that error appears in the above-identified patent and that said Letters Patent is hereby corrected as shown below:

On the title page, Item (75) Inventors

Delete: "Calogero Ribellino, Mascalucia (IT); Giovanni Benenati, S. Giovanni la Punta (IT); Karel Blaha, Pilser (CZ); Marek Stepan, Praha (CZ); Jindrich Duda, Prague (CZ)"

Insert: --Calogero Ribellino, Mascalucia (IT); Giovanni Benenati, S. Giovanni la Punta (IT); Karel Blaha, Plzen (CZ); Marek Stepan, Praha (CZ); Jindrich Duda, Prague (CZ)--

Signed and Sealed this  
Twenty-ninth Day of March, 2016

Michelle K. Lee  
*Director of the United States Patent and Trademark Office*